United States Patent
Watanabe

(10) Patent No.: US 10,620,092 B2
(45) Date of Patent: Apr. 14, 2020

(54) INERTIA VERIFICATION DEVICE FOR CHASSIS DYNAMOMETER SYSTEM

(75) Inventor: Kenji Watanabe, Ota (JP)

(73) Assignee: MEIDENSHA CORPORATION, Tokyo (JP)

( * ) Notice: Subject to any disclaimer, the term of this patent is extended or adjusted under 35 U.S.C. 154(b) by 1143 days.

(21) Appl. No.: 14/002,537

(22) PCT Filed: Mar. 2, 2012

(86) PCT No.: PCT/JP2012/055454
§ 371 (c)(1),
(2), (4) Date: Aug. 30, 2013

(87) PCT Pub. No.: WO2012/121171
PCT Pub. Date: Sep. 13, 2012

(65) Prior Publication Data
US 2013/0338957 A1    Dec. 19, 2013

(30) Foreign Application Priority Data
Mar. 4, 2011   (JP) ................................. 2011-047122

(51) Int. Cl.
G01M 17/007   (2006.01)
G01M 15/04    (2006.01)

(52) U.S. Cl.
CPC ...... *G01M 17/007* (2013.01); *G01M 17/0074* (2013.01); *G01M 15/044* (2013.01)

(58) Field of Classification Search
CPC .......... G01M 17/007; G01M 17/0074; G01M 15/044; G06F 19/00; G09B 19/00; B60L 9/00; G01L 3/22; G01L 3/242
(Continued)

(56) References Cited

U.S. PATENT DOCUMENTS 3,651,690 A * 3/1972 Pagdin .................... G01L 3/242
                                                      73/116.06
4,870,585 A   9/1989 Manzolini
(Continued)

FOREIGN PATENT DOCUMENTS

JP   02-021234 A   1/1990
JP   05-087554 U   11/1993
(Continued)

OTHER PUBLICATIONS

K. Watanabe et al, "Dynamometer System Tokushu Shin Gijutsu Shin Seihin Seigyo Keisoku System MEIDACS-DY6000P", Meiden Jiho, No. 4, Jul. 31, 2003, pp. 26-30.
(Continued)

*Primary Examiner* — Regis J Betsch
*Assistant Examiner* — Kaleria Knox
(74) *Attorney, Agent, or Firm* — Foley & Lardner LLP

(57) ABSTRACT

There has been a problem with operability when performing inertia verification, due to the fact that a setting window and a measurement result window are different. A setting display function section to set a setting value for measurement and a measurement result display function section that displays a result measured on the basis of the setting value are provided in one window on a display screen of an inertia verification device. The setting display function section has a setting value indicating section that indicates mechanical inertia, an operation condition setting section and a progress indicating section. The measurement result display function section has a monitor window indicating section and a measurement result indicating section.

7 Claims, 5 Drawing Sheets

(58) Field of Classification Search
USPC .............. 701/1, 29, 22; 73/116.06; 434/62
See application file for complete search history.

(56) References Cited

U.S. PATENT DOCUMENTS

| | | | |
|---|---|---|---|
| 5,521,824 A | | 5/1996 | Eagan et al. |
| 5,531,107 A | * | 7/1996 | Ganzhorn, Jr. ............ G01L 3/22 |
| | | | 73/116.06 |
| 5,542,290 A | * | 8/1996 | Suzuki .............. G01M 17/0072 |
| | | | 73/116.06 |
| 6,457,351 B1 | | 10/2002 | Yamamoto |
| 8,190,318 B2 | * | 5/2012 | Li ......................... B60K 6/445 |
| | | | 180/65.1 |
| 9,097,613 B2 | | 8/2015 | Konishi |
| 2002/0018982 A1 | * | 2/2002 | Conroy ................. G09B 9/042 |
| | | | 434/62 |
| 2007/0088465 A1 | * | 4/2007 | Heffington ............. G07C 5/085 |
| | | | 701/1 |
| 2007/0118258 A1 | * | 5/2007 | Probst .................. G01M 17/04 |
| | | | 701/31.4 |
| 2013/0333486 A1 | | 12/2013 | Watanabe |
| 2013/0339892 A1 | | 12/2013 | Watanabe et al. |

FOREIGN PATENT DOCUMENTS

| | | |
|---|---|---|
| JP | 08-278232 A | 10/1996 |
| JP | 10-281940 A | 10/1998 |
| JP | 2004-309290 A | 11/2004 |
| JP | 2005-010124 A | 1/2005 |
| JP | 2005-049353 A | 2/2005 |
| JP | 4039296 B2 | 11/2007 |
| JP | 2008-082857 A | 4/2008 |
| JP | 2008-224403 A | 9/2008 |
| JP | 2009-198480 A | 9/2009 |
| JP | 2011-027478 A | 2/2011 |

OTHER PUBLICATIONS

Watanabe, K. et al., USPTO Final Office Action U.S. Appl. No. 14/002,196 dated Oct. 30, 2015, 17 pgs.
Watanabe, K. et al., USPTO Notice of Allowance U.S. Appl. No. 14/002,562 dated Feb. 20, 2015, 8 pgs.
K. Watanabe, USPTO Non-Final Office Action dated Jun. 19, 2015, 16 pgs.
Machine translation of JP 2008-224403, 11 pgs.
Machine translation of JP 2009-198480, 6 pgs.
Watanabe, K. et al., USPTO Non-final Office Action U.S. Appl. No. 14/002,562 dated Oct. 24, 2014, 8 pgs.
K. Watanabe, USPTO Non-Final Office Action U.S. Appl. No. 14/002,196, dated Sep. 1, 2016, 15 pgs.
USPTO Notice of Allowance, U.S. Appl. No. 14/002,196, dated May 4, 2017, 15 pages.

\* cited by examiner

Diagram of a road load control device

INERTIA VERIFICATION DEVICE FOR CHASSIS DYNAMOMETER SYSTEM

TECHNICAL FIELD

The present invention relates to a verification device of an inertia value, which is used when controlling a running resistance of a chassis dynamometer.

BACKGROUND ART

As a chassis dynamometer control device, such a configuration as disclosed in a Patent Document 1 (FIG. 4) has been known as a well-known art. FIG. 5 is a block diagram of a running resistance control device of the chassis dynamometer. Driving wheels of a test vehicle 1 are placed on a roller 2 of the chassis dynamometer, and a torque produced by a dynamometer 3 is provided, as a load, to the test vehicle 1 through the roller 2.

In order for the test vehicle 1 on the chassis dynamometer to run in the same condition as that on the road, it is necessary to provide the vehicle (a tire surface) with the same load as that when running on the road. To add the running resistance equivalent to that on the road to the tire surface with the driving wheels of the test vehicle 1 placed on a roller surface of the chassis dynamometer, a running resistance obtained by taking account of a vehicle mechanical loss $F_S$ and a chassis dynamo mechanical loss $F_{ML}$ is provided to the tire surface. A running resistance setting section 4 generates a running resistance setting value $F_S$ according to a vehicle speed of the test vehicle A mechanical loss setting section (a chassis dynamo mechanical loss setting section) 5 generates the chassis dynamo mechanical loss $F_{ML}$ according to the vehicle speed of the test vehicle 1. A power control command of a controller section 6 is set by subtracting the chassis dynamo mechanical loss $F_{ML}$ from the running resistance setting value $F_S$, and the controller section 6 performs a power absorption control of the dynamometer 3 that is mechanically connected to the roller 2.

More specifically, a vehicle speed signal of the test vehicle 1, which is detected by a speed detector 7, is inputted to the running resistance setting section 4 and the mechanical loss setting section (the chassis dynamo mechanical loss setting section) 5, and the running resistance setting value $F_S$ according to the vehicle speed and the mechanical loss $F_{ML}$ according to the vehicle speed are calculated. A difference signal between both of the running resistance setting value $F_S$ and the mechanical loss $F_{ML}$ is determined at a subtracting section, then the power absorption control of the dynamometer 3 is performed through the controller 6 of the chassis dynamometer. Upon performing this control, the vehicle speed detected by the speed detector 7 and a torque detected by a load cell 8 are each fed back to the controller 6.

Meanwhile, as for a technique of verifying whether inertia corresponding to the test vehicle is closely simulated using a result of measured mechanical loss etc., a technique as disclosed in a Patent Document 2 has been known. As a manner of verification of an inertia control in the chassis dynamometer, after a warm-up operation of the chassis dynamometer is performed within a test speed range, a mechanical loss of a unit of the chassis dynamometer is measured for each speed. This measured mechanical loss is determined as a function of the speed for the following correction data of a measurement mechanical loss of the chassis dynamometer. After completion of these preparations, the chassis dynamometer is set as a torque control mode, and an inertia value required for the mode is set, then the chassis dynamometer is accelerated (or decelerated) while undergoing correction by the above mechanical loss. From an acceleration of the chassis dynamometer at this time, the verification is made by the fact as to whether the simulated inertia falls within allowable error limits.

CITATION LIST

Patent Document

Patent Document 1: Japanese Patent Application Kokai Publication No. JP2008-224403
Patent Document 2: Japanese Patent No. JP4039296

SUMMARY OF THE INVENTION

In the Patent Document 1, for the measurement of the mechanical loss, a mechanical loss measurement by a coasting method and a mechanical loss measurement by a motoring method are switched and each mechanical loss measurement value is measured. Then, by making verification by matching of a mechanical loss measurement result of the coasting method or the motoring method, accuracy of the running resistance is increased. Upon the measurement and the verification, various measured data is transmitted to an operation room that is separate from a test site, and is displayed on a screen of a console which is formed by an installation computer. As the display of the screen during the measurement of the mechanical loss in the Patent Document 1, for instance, setting items are displayed as shown in FIG. 4 of the Patent Document 1, and the measured mechanical loss is displayed in graph form on a different window as shown in FIG. 5 of the Patent Document 1.

Therefore, a plurality of representation windows during the mechanical loss measurement are required. Further, a vehicle weight etc. set in the current measurement is unknown.

On the other hand, also in the Patent Document 2 of the inertia verification manner, as shown in FIG. 6 of the Patent Document 2, although a window showing a target value of the operation in graph form is present, the same problems as those mentioned above of the Patent Document 1 arise.

It is therefore an object of the present invention to provide an inertia verification device of a chassis dynamometer system, which is capable of visually recognizing or grasping states and conditions during the progress of the measurement in one window on a display screen.

According to one aspect of the present invention, an inertia verification device verifying setting inertia used in a running resistance control of a chassis dynamometer system in which a test vehicle is placed on a roller and the running resistance control of the vehicle is performed according to a control command from a console, the inertia verification device comprises: a setting display function section to set a setting value for measurement and a measurement result display function section that displays a result measured on the basis of the setting value, and both the setting display function section and the measurement result display function section is displayed in one window on a display screen of the console.

According to another aspect of the present invention, the setting display function section is provided with an operation condition setting section, and the operation condition setting section has a vehicle type selecting function of selecting a drive type of the vehicle and a visual indicating section that visually indicates a measurement state of an operating roller corresponding to the vehicle selected by the vehicle type selecting function.

According to a further aspect of the present invention, the inertia verification device further comprises: a progress indicating section that indicates, in the window on the display screen of the console, a measurement pattern for each step for the inertia verification with a pattern of acceleration/constant speed/deceleration being one cycle.

According to a still further aspect of the present invention, the progress indicating section recognizably indicates a current measurement point.

According to a still further aspect of the present invention, the measurement result display function section has a monitor window indicating section that indicates, in graph form, a measured vehicle speed and a measured acceleration and a measurement result indicating section having each display area that indicates target and measurement values of drive torque, a braking force and a calculated inertia value, set in each operating pattern.

EMBODIMENTS FOR CARRYING OUT THE INVENTION

Figure 1:
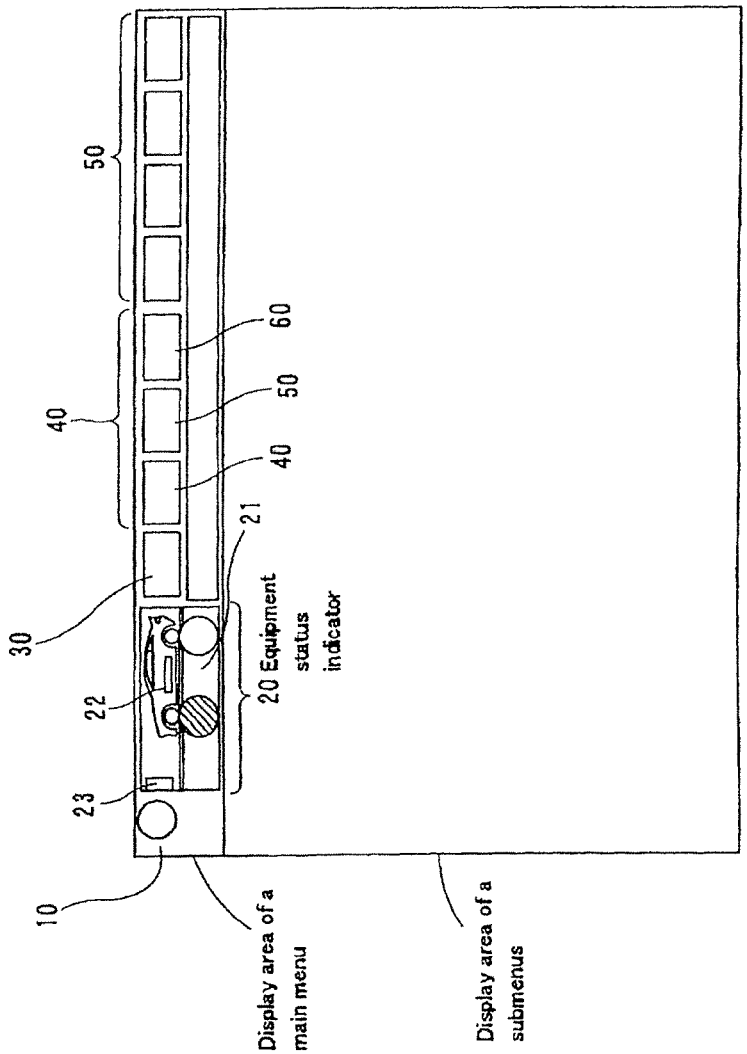
FIG. 1 is a schematic system diagram of a top window of an operation display unit, showing an embodiment of the present invention.

FIG. 1 is a schematic system diagram of an operation display unit constructed on a console (a computer) of a chassis dynamometer system of the present invention, which shows an example of forms or configuration of the top window of the operation display unit.

In FIG. 1, the top window of the operation display unit is provided with a menu function section 10, a chassis dynamometer status indicating function section 20, an operation lock function section 30, a mode setting function button group 40 and an equipment ON/OFF change function button group 50.

The menu function section 10 has a vehicle ID calling section, an alarm setting window calling section, a maintenance menu calling section, a warm-up window calling section, a monitor window calling section and a measurement window calling section (each, not shown) Each calling section is displayed on the window of a screen all together by clicking the menu function section 10.

The chassis dynamometer status indicating function section 20 has, in an area which indicates a setting status of a currently set chassis dynamometer, a front/rear roller use/non-use indicating area, a vehicle speed indicating area and a cooling fan use/non-use indicating area. When power is turned on and the top window shown in FIG. 1 is displayed, the setting status of the chassis dynamometer currently set at the chassis dynamometer status indicating function section 20 is indicated. For instance, in a case where a type of the last tested vehicle is a front-wheel-drive vehicle and a roller of the chassis dynamometer is set as a front-wheel-drive, contrast of a front wheel roller of front and rear rollers of the status indicating function section 20 brightens or is high (in the drawing, it is shown by oblique lines), and the front wheel roller is indicated with its indication being different from that of a rear wheel roller.

With respect to the cooling fan use/non-use indicating area 23 of the status indicating function section 20, in a case where a cooling fan located in front of the roller (the vehicle) is in an ON state, a figure imitating the cooling fan is brightly indicated in the indicating area 23, thereby visually recognizing the ON state of the cooling fan. Further, a vehicle speed that is being measured is digitally indicated in the vehicle speed indicating area 22. Here, when attempting to change the cooling fan to an OFF state, by clicking an ON/OFF selection function of the cooling fan which is provided in the equipment ON/OFF change function button group 50 and setting it to OFF, the cooling fan becomes OFF, and the bright indication of the imitated cooling fan in the cooling fan use/non-use indicating area 23 immediately disappears.

Accordingly, by providing the chassis dynamometer status indicating function section 20 in the top window of the operation display unit, it is possible to visually grasp a present system condition of the equipment and the speed during the test upon start-up of the system. Additionally, the change of the ON/OFF state of the cooling fan can also be reflected immediately.

The mode setting function button group 40 has a vehicle type selection window calling function section, a manual operation window calling function section and a cooling fan operation mode selecting function section.

The equipment ON/OFF change function button group 50 has selection functions, to directly control each device of the test equipment, such as the cooling fan ON/OFF selection function, a roller lock/release selection function, an auxiliary equipment ON/OFF selection function and a dynamometer power ON/OFF selection function.

Figure 2:
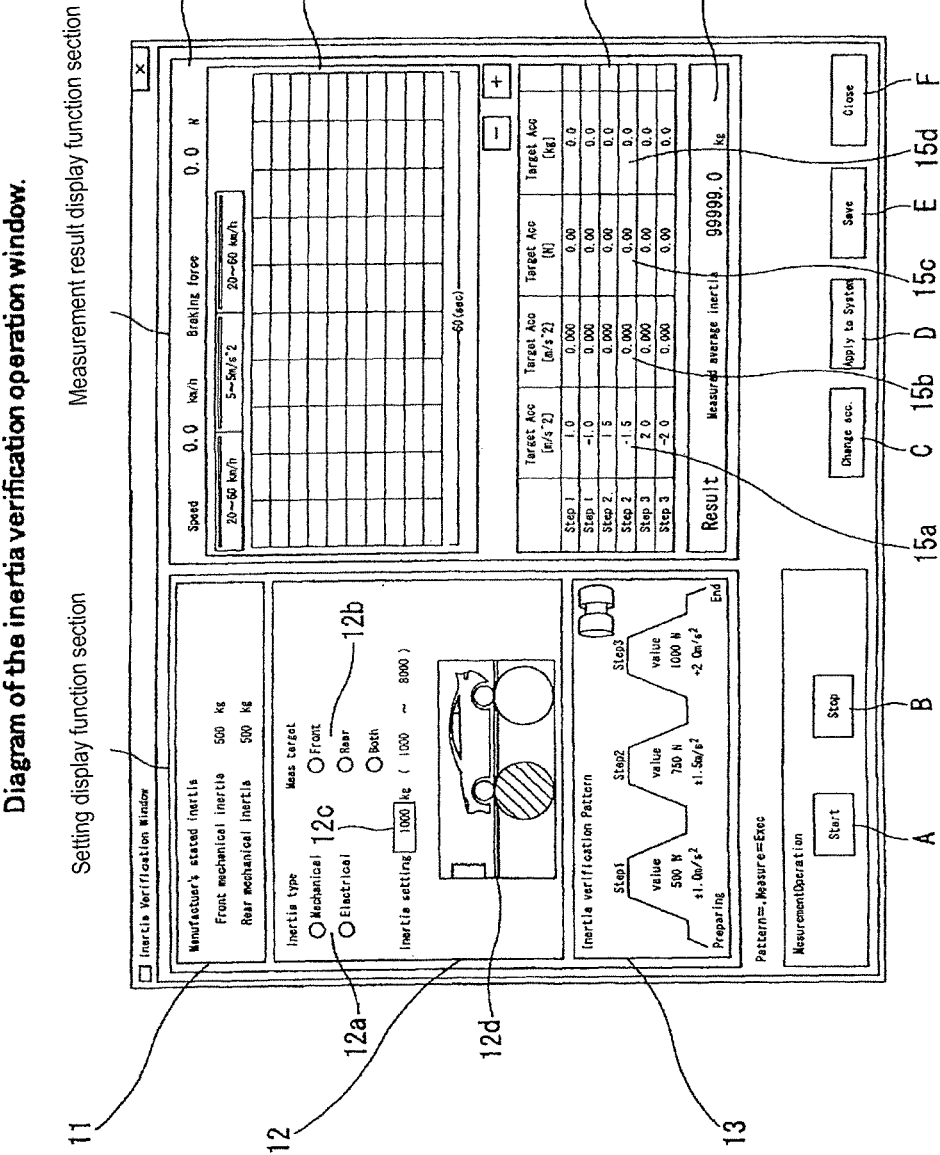
FIG. 2 is a system diagram of an inertia verification window according to the present invention.

Upon the inertia verification, when selecting the top menu function section 10 and selecting a measurement window calling section in the menu function section 10, an inertia verification window shown in FIG. 2 is called. The called inertia verification window is provided at a left side thereof with a setting display function section, while the inertia verification window is provided at a right side thereof with a measurement result display function section. These sections are displayed in one window of a display screen.

The setting display function section at the left side of the window has each display area of a setting value indicating section 11, an operation condition setting section 12 and a progress indicating section 13. The setting value indicating section 11 indicates an inertia value of the currently set chassis dynamometer with each inertia value of front wheel side and rear wheel side indicated individually.

The operation condition setting section 12 has an inertia selecting button 12a to select mechanical inertia or electrical inertia as a setting inertia, a vehicle type selecting button 12b to select a drive type of the vehicle, a vehicle inertia value setting section 12c and a visual indicating section 12d that visually indicates a measurement state. In the visual indicating section 12d shown in FIG. 2, as the drive type of the measurement vehicle, front wheel drive is selected. To indicate that the front wheel side roller is selected, the front wheel side roller is indicated with contrast of the front wheel side roller being different from that of the rear wheel side roller. Further, the display area is arranged so as to be able to easily visually recognize the setting state by graphic window or display with the setting inertia value indicated at the vehicle.

The progress indicating section 13 indicates a measurement pattern for each step for the inertia verification. Here, command patterns, setting torques of which are different from each other, are indicated by three steps with a pattern of acceleration/constant speed/deceleration being one cycle. At step 1, a pattern in which drive torque to the dynamometer is set to 500 N and acceleration of the roller is set to ±1.0 m/s² is indicated. Likewise, patterns of step 2 and step 3, each drive torque of which is different from that of the step 1, are indicated. Further, the progress indicating section 13 has a progress function. Color or contrast etc. on the pattern is changed along the measurement pattern of acceleration/run/deceleration at each step in synchronization with a current measurement progress position, thereby visually grasping the measurement progress position.

The measurement result display function section at the right side of the called inertia verification window has a monitor window indicating section 14, a measurement result indicating section 15, a vehicle speed/brake monitor section 16 and a final inertia indicating section 17 that indicates measured inertia.

The monitor window indicating section 14 indicates, in graph form, a target vehicle speed and a detected acceleration during the measurement of the inertia set in the operation condition setting section 12 in synchronization with progress of the measurement.

The measurement result indicating section 15 has each display area of an each-step acceleration/deceleration target value indication 15a, an acceleration measurement value indication 15b, a braking force measurement value indication 15c and a calculated inertia value indication 15d.

Next, the measurement of the inertia verification according to the present invention will be explained.

When each setting value according to the measurement vehicle type is set in the setting display function section in the inertia verification window shown in FIG. 2, states and conditions for execution of the measurement are indicated in each display area of the operation condition setting section 12 and the progress indicating section 13 by graphic window or display. After grasping this graphic window and the setting values and checking that there is no error in the selection of the operating roller according to the vehicle type, a start button A is selected, then the measurement is started from the step 1. With this operation, the color or the contrast on the pattern changes according to degree of the progress at the step 1, and the current measurement progress position is indicated.

Figure 3:
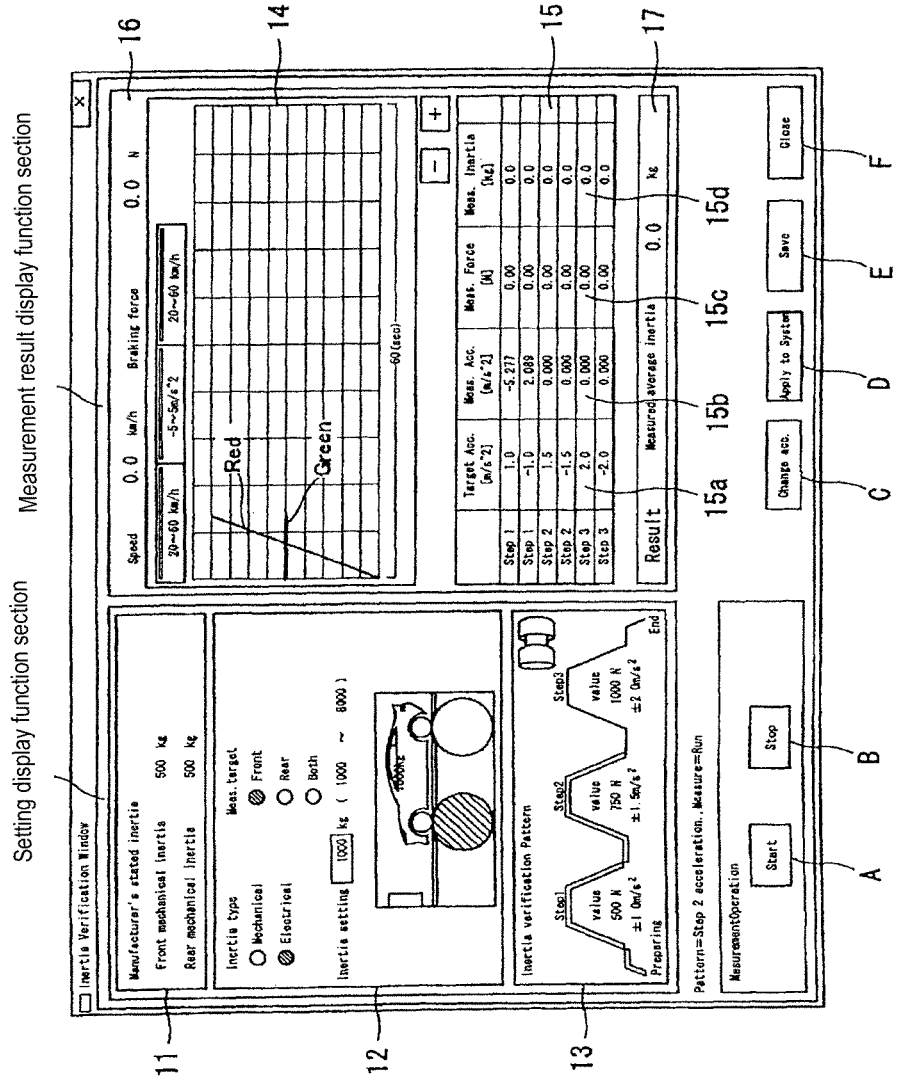
FIG. 3 is a diagram showing an example of an inertia verification window for explanation.

FIG. 3 is a diagram of an inertia verification window when selecting the electrical inertia, which shows a time point when the measurement proceeds to the step 2 after completion of the measurement of the step 1. The measurement progress is indicated with the color or the contrast of the step 1 being different from those of the step 2 and the step 3 in the progress indicating section 13. At the same time, in the monitor window indicating section 14, a speed calculated from the setting torque, which is indicated e.g. in red color and the acceleration which is indicated e.g. in green color are indicated, in graph form, in accordance with the measurement progress. Also, the vehicle speed and the braking force at this time during the measurement are digitally indicated in the vehicle speed/brake monitor section 16. Furthermore, the target acceleration 15a set at the step 1, the measured acceleration 15b, the measured torque 15c and the inertia 15d are indicated in the measurement result indicating section 15. Subsequently, the measurement of the step 2 and the step 3 is also executed in the same manner, then an average inertia of the steps 1 to 3 is indicated in the final inertia indicating section 17.

In addition, by selecting a button B, the inertia verification can be forcibly suspended halfway through the measurement. In a case where there arises a great error between the inertia of the setting value and the measurement result of the inertia verification, by selecting a system shift button D, the inertia value indicated in the final inertia indicating section 17 is reflected in the system as an initial value of the inertia value of the chassis dynamometer system shown in FIG. 3.

Moreover, with regard to change of the target values of the acceleration and the drive torque etc., it is possible by clicking a target value change button C. A button E is a save button for saving the measurement result etc., and a button F is an end button.

Figure 4:
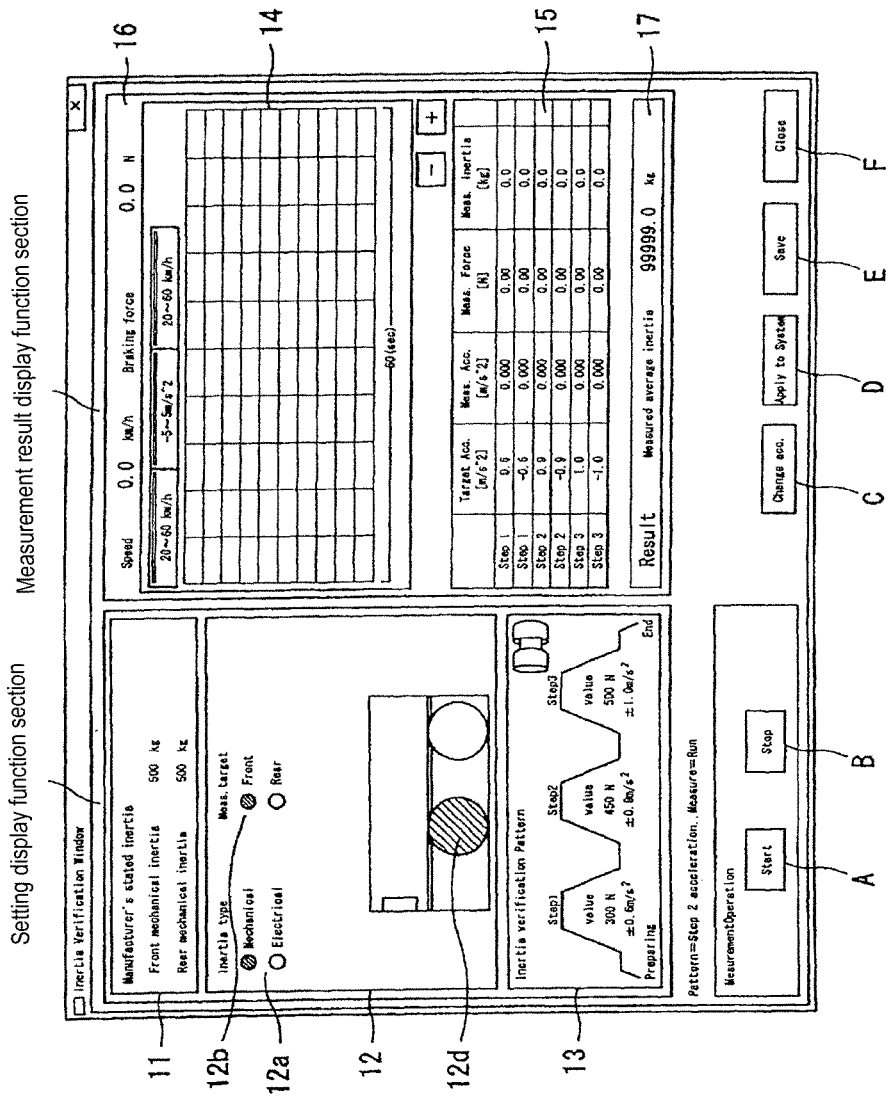
FIG. 4 is a diagram showing an example of an inertia verification window (mechanical inertia) for explanation.
Figure 5:
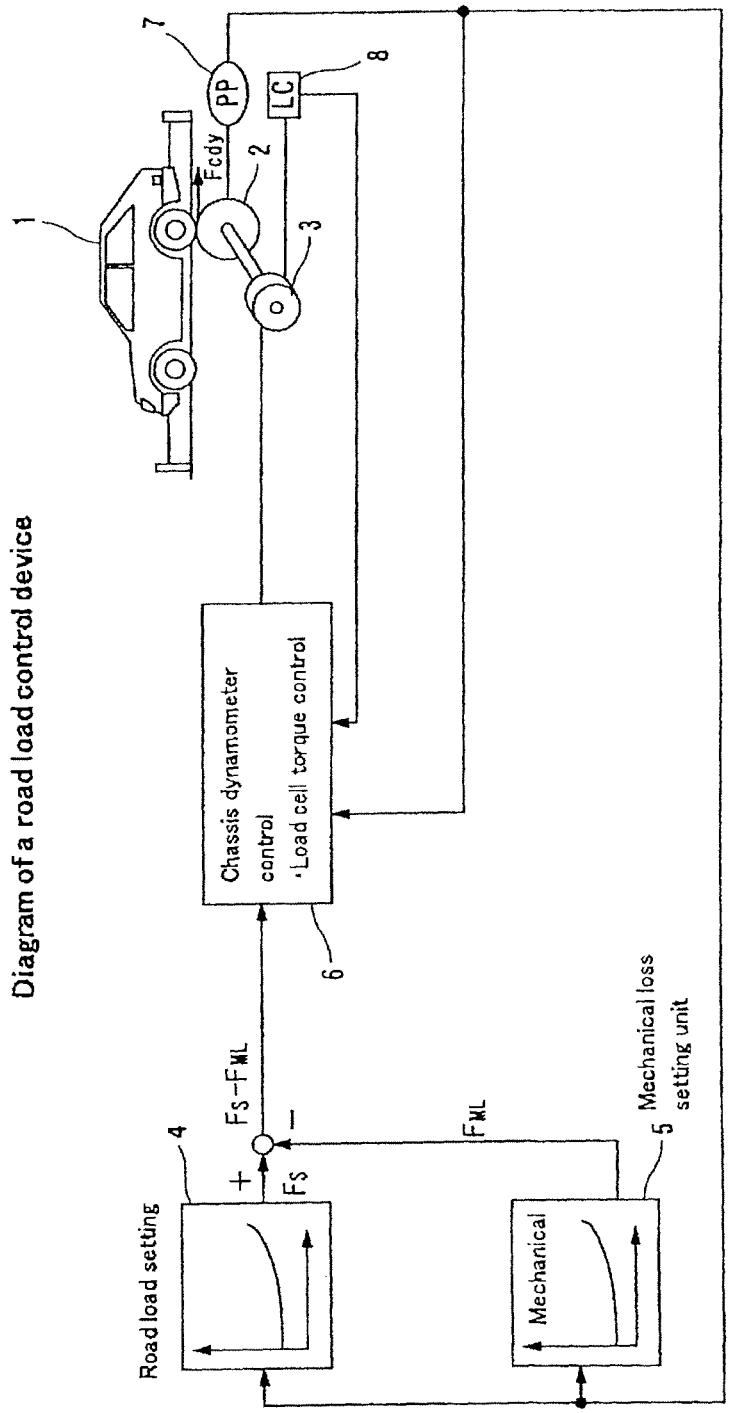
FIG. 5 is a schematic block diagram of a running resistance control device of a chassis dynamometer.

FIG. 4 is a diagram of an inertia verification window when selecting the mechanical inertia. In the case of the mechanical inertia, if a flywheel is present in the chassis dynamometer system, verification including "chassis dynamometer"+"flywheel" is performed. If there is no flywheel, the inertia verification is the mechanical inertia verification of only a body of the chassis dynamometer. When selecting the mechanical inertia, a Both selecting button of the inertia selecting button 12a, the vehicle inertia value setting section 12c and the indication of the vehicle in the visual indicating section 12d disappear, and a visual indication of only the roller of the chassis dynamometer remains.

Further, regarding this indicated roller, in a case where an evaluation model set by the setting value indicating section 11 is the front-wheel-drive system, as shown in FIG. 4, the visual indicating section 12d visually indicates that the front roller is selected with only its contrast changed. The other displays and indications are the same as those of the verification of the electrical inertia.

As explained above, according to the present invention, by providing the setting display function section and the measurement result display function section in the called one window of the display screen during the inertia verification, it is possible to check and confirm the setting pattern such as the inertia value of the vehicle type of an object to be measured and the acceleration during the measurement without error. Further, since it is possible to visually ceaselessly grasp the measurement values based on this setting, operability when performing the inertia verification can be greatly increased. Also, an error in setting of verification value inputted to the chassis dynamometer system due to an input error of the setting value can be avoided, and highly accurate test of fuel economy and exhaust gas of the vehicle can be realized.

The invention claimed is:

1. An inertia verification device that verifies a setting inertia used in a running resistance control of a chassis dynamometer system in which a test vehicle is placed on a roller and the running resistance control of the test vehicle is performed according to a control command from a console, the inertia verification device comprising:
   a setting display function section configured to set a setting value for measurement of inertia of the chassis dynamometer system; and
   a measurement result display function section configured to display a result measured on the basis of the setting value,
   wherein the setting display function section and the measurement result display function section are displayed at the same time in one window on a display screen of the console, and wherein an inertia value indicated in a final inertia indicating section provided in the measurement result display function section is reflected in the chassis dynamometer system as an initial value of the inertia value of the chassis dynamometer system.

2. The inertia verification device of the chassis dynamometer system as claimed in claim 1, wherein:
the setting display function section is provided with an operation condition setting section, and
the operation condition setting section has
a vehicle type selecting function configured to select a drive type of the test vehicle; and
a visual indicating section configured to visually indicate a measurement state of an operating roller corresponding to the drive type of the test vehicle selected by the vehicle type selecting function.

3. The inertia verification device of the chassis dynamometer system as claimed in claim 1, further comprising:
a progress indicating section configured to indicate, in the window on the display screen of the console, a measurement pattern for each step for the inertia verification with a pattern of acceleration/constant speed/deceleration being one cycle of a step.

4. The inertia verification device of the chassis dynamometer system as claimed in claim 3, wherein:
the progress indicating section is further configured to recognizably indicate a current measurement point.

5. The inertia verification device of the chassis dynamometer system as claimed in claim 1, wherein:
the measurement result display function section has
a monitor window indicating section configured to indicate, in graph form, a measured vehicle speed and a measured acceleration; and
a measurement result indicating section having display areas that each indicates target and measurement values of drive torque, a braking force and a calculated inertia value, set in each operating pattern.

6. The inertia verification device of the chassis dynamometer system as claimed in claim 1, wherein:
the setting display function section is configured to set at least one of an inertia type or an inertia setting.

7. The inertia verification device of the chassis dynamometer system as claimed in claim 1,
wherein the measurement result display function section displays at least one inertia result.

* * * * *